United States Patent
Wang et al.

(10) Patent No.: US 11,605,957 B2
(45) Date of Patent: Mar. 14, 2023

(54) DYNAMIC POWER SUPPLY SYSTEM

(71) Applicant: General Electric Company, Schenectady, NY (US)

(72) Inventors: Ruxi Wang, Cohoes, NY (US); Tomas Sadilek, Durham, NC (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 16/929,904

(22) Filed: Jul. 15, 2020

(65) Prior Publication Data

US 2022/0021223 A1 Jan. 20, 2022

(51) Int. Cl.
| | |
|---|---|
| *H02J 7/00* | (2006.01) |
| *H02M 3/158* | (2006.01) |
| *H02J 1/02* | (2006.01) |
| *H02J 1/12* | (2006.01) |
| *H01M 10/44* | (2006.01) |

(52) U.S. Cl.
CPC ......... *H02J 7/0024* (2013.01); *H01M 10/441* (2013.01); *H02J 1/02* (2013.01); *H02J 1/12* (2013.01); *H02J 7/0016* (2013.01); *H02M 3/158* (2013.01); *B64D 2221/00* (2013.01)

(58) Field of Classification Search
USPC ............... 320/125, 126, 127, 135, 136, 137
See application file for complete search history.

(56) References Cited

U.S. PATENT DOCUMENTS

| | | | |
|---|---|---|---|
| 8,030,788 B2 | 10/2011 | Xu et al. | |
| 8,810,070 B2 * | 8/2014 | Butzmann | H02J 7/0013 307/83 |
| 9,065,154 B2 * | 6/2015 | Butzmann | H02J 7/0013 |
| 9,184,660 B2 * | 11/2015 | Sagneri | H02M 1/4241 |
| 9,190,929 B2 | 11/2015 | Divan et al. | |
| 9,673,639 B2 | 6/2017 | Okuda et al. | |
| 2005/0194937 A1 * | 9/2005 | Jacobs | H02J 7/0018 320/135 |
| 2010/0213897 A1 | 8/2010 | Tse | |
| 2012/0069606 A1 * | 3/2012 | Sagneri | H02M 3/335 363/21.02 |
| 2013/0038289 A1 * | 2/2013 | Tse | H02J 7/0013 320/126 |
| 2013/0343089 A1 | 12/2013 | Gupta et al. | |
| 2018/0233614 A1 * | 8/2018 | Dai | H02J 3/381 |

FOREIGN PATENT DOCUMENTS

| | | |
|---|---|---|
| WO | 2011/103469 A2 | 8/2011 |
| WO | WO-2019239640 A1 * 12/2019 | H02J 7/0013 |

* cited by examiner

*Primary Examiner* — Brian Ngo
(74) *Attorney, Agent, or Firm* — McGarry Bair PC (57) ABSTRACT

A power supply system includes a set of power supply units, each power supply unit arranged electrically in series and defining a common power supply, each power supply unit having a power module and a selective bypass for selectively bypassing the respective power module. The power supply system can meet a power demand.

16 Claims, 4 Drawing Sheets

DYNAMIC POWER SUPPLY SYSTEM

TECHNICAL FIELD

The disclosure relates to a power supply system adapted to supply dynamic power to a power bus.

BACKGROUND OF THE INVENTION

Electrical power distribution systems manage the allocation of power from energy sources to electrical loads that consume the distributed electrical power. In an aircraft, one or more turbine engines provide for propulsion of the aircraft, and can further provide mechanical energy to generate electricity that is supplied to a number of selectively interconnected power buses. The power buses can be selectively connected by way of contactors, and ultimately power a number of different accessories such as environmental control systems (ECS), in-flight entertainment systems, windshield deicing, galleys, fuel pumps, and hydraulic pumps, e.g., equipment for functions needed on an aircraft other than propulsion. For example, contemporary aircraft utilize electrical power for electrical loads related to avionics, motors, and other electric equipment.

BRIEF DESCRIPTION

In one aspect, the present disclosure relates to a dynamic power supply system, includes a set of power supply units arranged electrically in series and defining a common direct current (DC) power supply system output, each of the set of power supply units including a power module having a set of energy storage units, a DC to DC power converter connected with the power module and an energy storage unit power output, and a selective bypass arranged to controllably bypass the power module across the energy storage unit power output, and a controller module communicatively connected with each respective DC to DC power converter and the selective bypass, and configured to operate at least a first subset of the energy storage units to operably supply energy by way of operating the respective subset of the DC to DC power converters, and to operate at least a second subset of the energy storage units to operably bypass the respective subset of the selective bypasses.

In another aspect, the present disclosure relates to a dynamic power supply system for an aircraft power distribution system, including at least one generator, a direct current (DC) power bus selectively connecting the at least one generator with at least one electrical load, a set of power supply units arranged electrically in series and defining a common DC power supply system output selectively connecting with the DC power bus, each of the set of power supply units including, a power module having a set of energy storage units, a DC to DC power converter connected with the power module and an energy storage unit power output, and a selective bypass arranged to controllably bypass the power module across the energy storage unit power output, and a controller module communicatively connected with each respective DC to DC power converter and the selective bypass, and configured to determine a presence of a supplemental power demand, and in response to determining the presence of the supplemental power demand, operate at least a first subset of the power supply units to operably supply supplemental energy to the DC power bus by way of operating the respective subset of the DC to DC power converters, and to operate at least a second subset of the power supply units to operably bypass the respective subset of the selective bypasses such that power supplied at the common DC power supply system output meets the power demand.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

Aspects of the present disclosure are described herein in the context of an aircraft, which enables production of electrical power from an energy source such as a turbine engine, jet fuel, hydrogen, etc., or, for example, from an electrical energy storage unit or device. However, it will be understood that the disclosure is not so limited and has general applicability to power distribution systems or electrical energy supplying configurations in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

While "a set of" various elements will be described, it will be understood that "a set" can include any number of the respective elements, including only one element. The use of the terms "proximal" or "proximally" refers to moving in a direction toward another component, or a component being relatively closer to the other as compared to another reference point. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implementing particular abstract data types. In another non-limiting example, a controller module can also include a data storage component accessible by the processor, including memory, whether transient, volatile or non-transient, or non-volatile memory.

As used herein, a controllable switching element, or a "switch" is an electrical or electro-mechanical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The disclosure can be implemented in any electrical circuit environment having a switch. A non-limiting example of an electrical circuit environment that can include aspects of the disclosure can include an aircraft power system architecture, which enables production or supplying of electrical power from a power source (e.g. a generator or power storage unit or device), and delivers the electrical power to a set of electrical loads via at least one solid-state switch, such as a solid-state power controller (SSPC) switching device. One non-limiting example of the SSPC can include a silicon carbide (SiC) or Gallium Nitride (GaN) based, high power switch. SiC or GaN can be selected based on their solid-state material construction, their ability to handle high voltages and large power levels in smaller and lighter form factors, and their high speed switching ability to perform electrical operations very quickly. Additional switching devices or additional silicon-based power switches can be included.

The exemplary drawings are for purposes of illustration only and the dimensions, positions, order and relative sizes reflected in the drawings attached hereto can vary.

Figure 1:
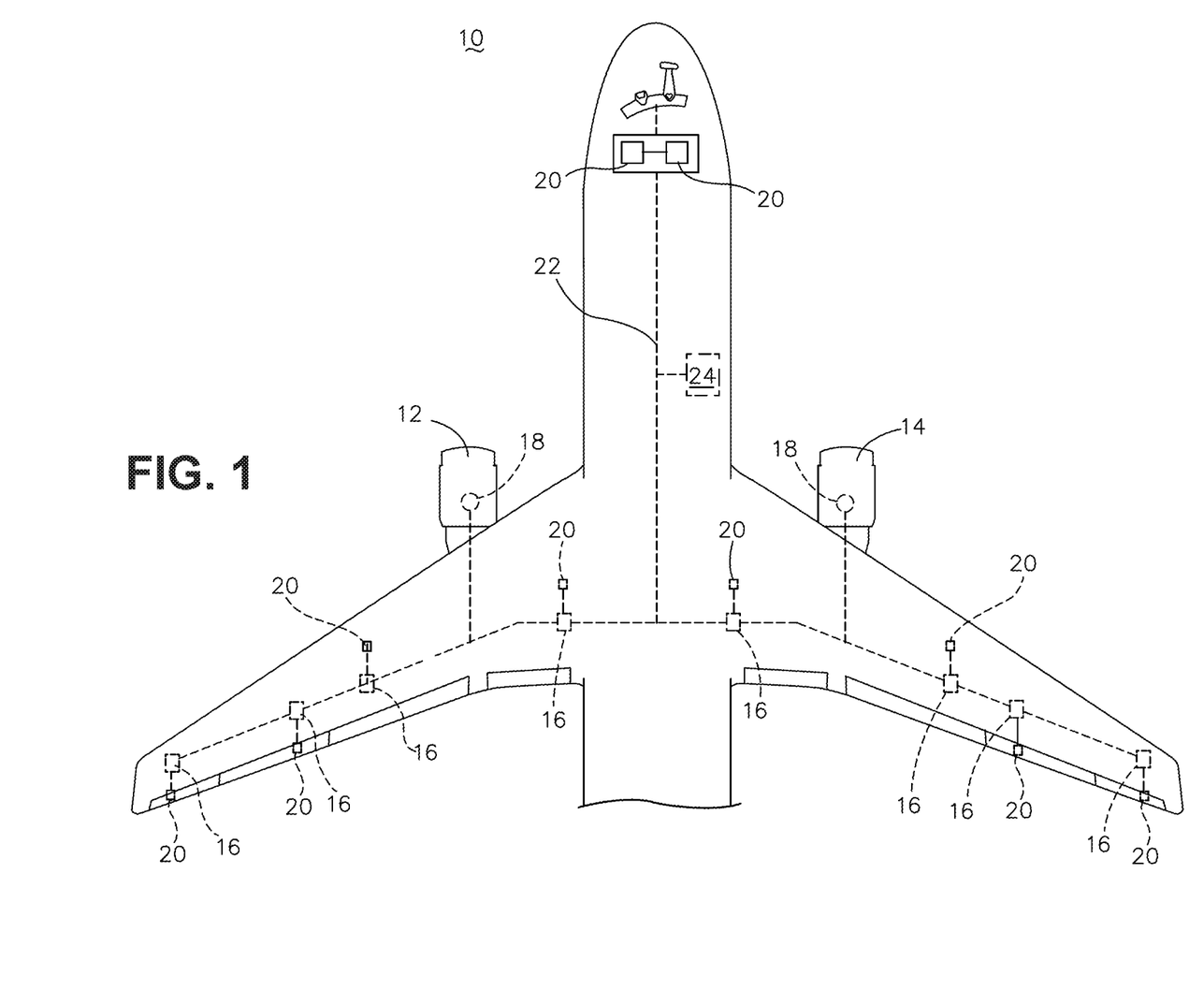
FIG. 1 is a top down schematic view of an example aircraft and power distribution system of an aircraft including a dynamic power supply system, in accordance with various aspects described herein.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as an electric machine or a generator 18. The aircraft 10 is shown further having a set of power-consuming components, or electrical loads 20, such as for instance, an actuator load, flight critical loads, and non-flight critical loads. The electrical loads 20 are electrically coupled with at least one of the generators 18 via a power distribution system including, for instance, power transmission lines 22, power bus such as a DC power bus, or bus bars, and power distribution nodes 16.

The aircraft 10 can further include a supplemental power source, illustrated schematically as a dynamic power supply system 24 connected with the transmission lines 22 or bus bars. Non-limiting examples of the dynamic power supply system 24 can include power conversion components adapted to convert power stored in or supplied by the dynamic power supply system 24 to power suitable for the transmission lines for distribution. While a single dynamic power supply system 24 is schematically illustrated, non-limiting aspects of the disclosure can be included wherein a set of dynamic power supply systems 24, includes, but not limited to, a bank of batteries, a set of battery cells, or the like, are included. In yet another non-limiting example of the disclosure, the set of dynamic power supply systems 24 can include at least one rechargeable battery, that is, a battery adapted to be at least partially electrically discharged and recharged over a number of cycles.

It will be understood that the illustrated aspect of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the generator 18. The generator 18, in turn, generates power, such as AC or DC power, and provides the generated power to the transmission lines 22, which delivers the power to the power distribution nodes 16, positioned throughout the aircraft 10. In the illustrated example, the transmission lines 22 can include DC transmission lines 22, which receives DC power from the generator 18 (e.g. by way of direct DC power generation, or conversion of AC power generated by the generator 18). The power distribution nodes 16 receive the DC power via the transmission lines 22, and can provide switching, power conversion, or distribution management functions, as needed, to provide the desired electrical power to the electrical loads 20 for load operations. In further non-limiting aspects of the disclosure, additional power, supplemental power, redundant power, or the like, can be supplied to the transmission lines 22 via electrical power stored in the one or more dynamic power supply systems 24, as requested or desired for load operations.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one set of dynamic power supply systems 24 can be operated, enabled, or connected for providing power to the electrical loads 20. Additional management functions can be included.

It will be understood that while aspects of the disclosure are shown in an aircraft environment of FIG. 1, the disclosure is not so limited and can have applicability in a variety of environments. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Desired power for the power distribution system can be based on a desired or demanded power (e.g. a "power demand"). In non-limiting examples, the power demand can include a power demand input received at a controller module tasked with ensuring an adequate supply of power is provided to operate the electrical loads 20. In one example, when the power demand exceeds the capacity of a steady power supply, such as the generator 18, the dynamic power supply system 24 can operate to provide supplemental or additional power to meet the power demand. In other non-limiting aspects of the disclosure, the dynamic power supply system 24 can provide the primary power supply to the power distribution system, and be supplemented when necessary by additional power sources.

Further non-limiting examples of power demand can include data or profiles related to expected power demands of an electrical system, anticipated power demands of an electrical system, predicted or estimated power demands of an electrical system, specifics related to the power demand of a subcomponent of an electrical system (e.g. a motor, a light bulb, a high power demand when starting compared with a smaller power demand once operating), criticality of the component or electrical system, or the like.

Furthermore, the number and placement of the various components depicted in FIG. 1 are also non-limiting examples of aspects associated with the disclosure. For example, while the positions of various components have been illustrated relative to the configuration of the aircraft 10 (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
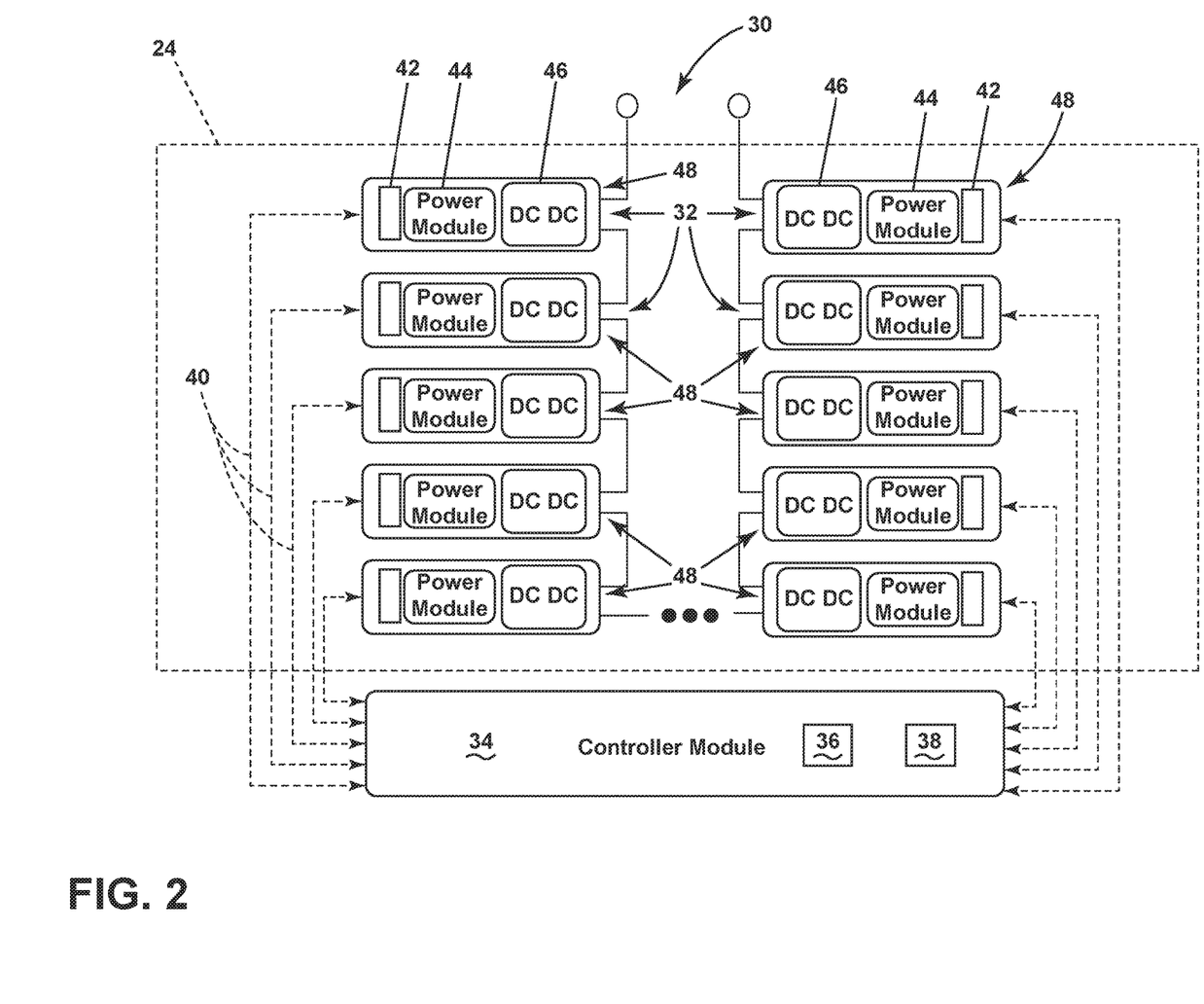
FIG. 2 is a schematic illustration of the dynamic power supply system of FIG. 1, including a power supply unit, in accordance with various aspects described herein.

Referring now to FIG. 2, a schematic illustration of an exemplary power distribution system having a dynamic power supply system 24 of FIG. 1. As shown, the dynamic power supply system 24 can include a set of power supply units 32 arranged electrically in series and defining a common DC power supply system output 30. The dynamic power supply system 24 can be communicatively connected with a controller module 34 having a processor 36 and memory 38. In one non-limiting example, the controller module 34 can be a remote or separate unit from the dynamic power supply system 24, or can be integral with the dynamic power supply system 24. In another non-limiting example, the controller module 34 can include a power system controller module 34 that incorporates control schema of the entire power distribution system, is adapted to provide or otherwise communicate instructions for the entire power distribution system, including but not limited to, generator 18 control, electrical load 20 control, or a combination thereof. In this sense, the controller module 34 can receive instruction from another controller module 34 remote from the dynamic power supply system 24. The controller module 34 can be further communicatively connected with each respective power supply unit 32, for example, by way of communication connections 40, to independently control each of the respective power supply units 32.

Each of the set of power supply units 32 can further include a respective power module management system 42, a power module 44, a DC to DC power converter 46, and a respective energy storage power output 48. In this sense, the set of energy storage power outputs 48 is arranged electrically in series to define the common DC power supply system output 30.

Figure 3:
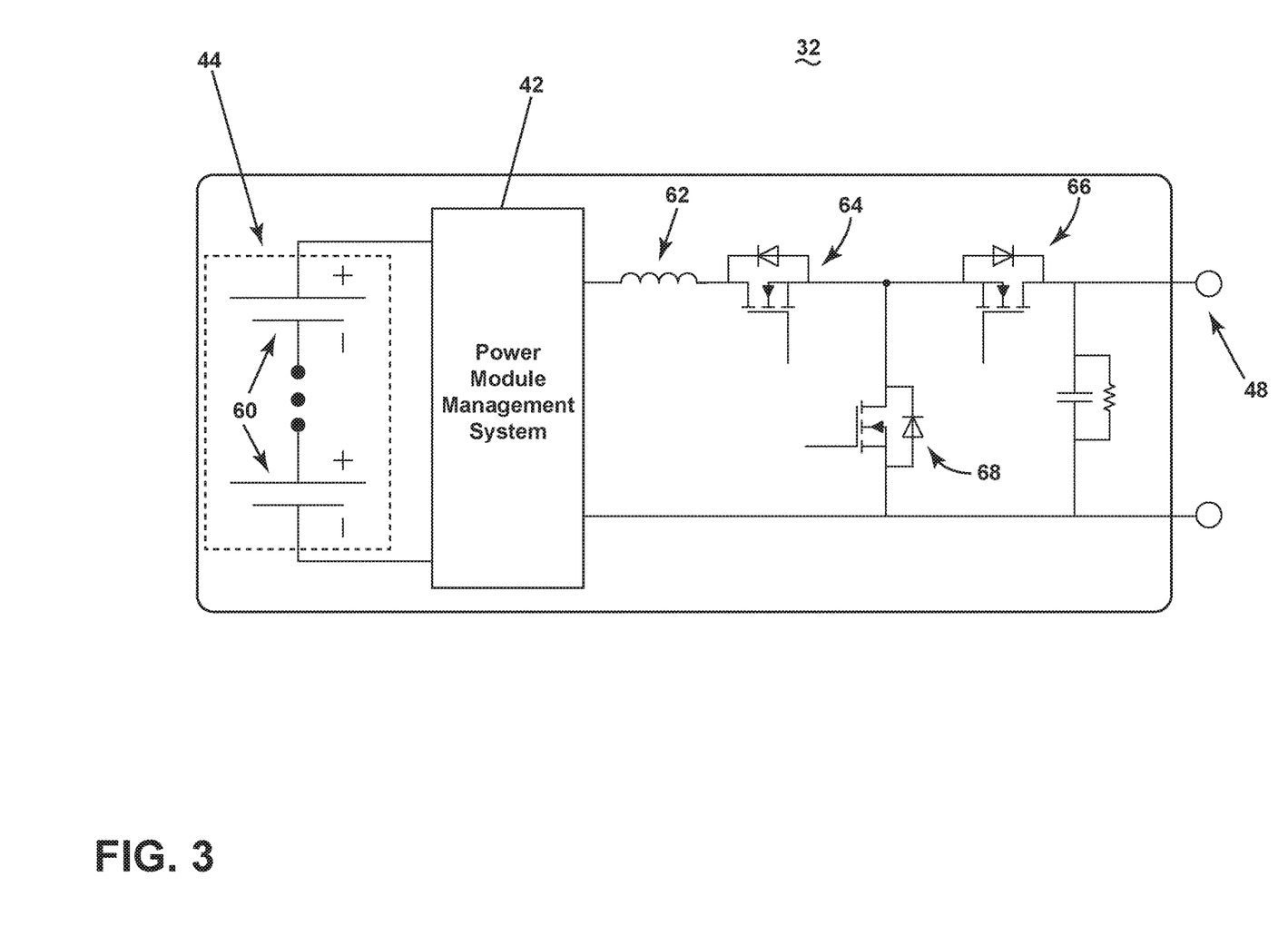
FIG. 3 is a schematic illustration of the power supply unit of FIG. 2, in accordance with various aspects described herein.

Turning now to FIG. 3, each of the respective power supply units 32 can include a similar composition. As shown, the power module 44 can include, or be defined by, a set of DC energy storage units, shown as a set of batteries 60 arranged electrically in series. While a set of batteries 60 is shown, the set of energy storage units can include any dischargeable, rechargeable, or power-generating component, including, but not limited to, a bank of batteries, a bank of rechargeable batteries, one or more fuel cells, a set of super capacitors, a set of photovoltaic cells, the like, or a combination thereof. Collectively, the set of energy storage units is connected with the power module management system 42, which can be configured or adapted to operably control the operation of the respective power supply unit 32. The control of the power module management system 42 can include, but is not limited to, the discharge of, or the supplying of power from the power module 44, switching operations of the power supply unit 32, recharging operations of the power module 44, or health management functions of the power supply unit 32, as needed.

The power supply unit 32 further is shown having three switching modules, a first switching module 64 positioned electrically in series with a second switching module 66 between the power module 44 and the energy storage unit power output 48, and a third switching module 68 positioned across the energy storage unit power output 48 and between the first switching module 64 and the second switching module 66. In one non-limiting example, the second switching module 66 and the third switching module 68 can operate as a group to define a selective bypass for the respective energy storage unit power output 48, that is, when both the second switching module 66 and the third switching module 68 allow conduction across the switches 66, 68, the power supply unit 32 can be bypassed from the series arrangement of the set of power supply units 32 of the dynamic power supply system 24. As used herein, the power supply unit 32 being "bypassed" means that no power is supplied from that particular power supply unit 32 to the energy storage power output 48 or accumulated at the common DC power supply system output 30. In this example of bypassing the power supply unit 32, it is envisioned that the first switching module 64 is operated in a non-conducting mode.

In another non-limiting example, the first switching module 64 and the second switching module 66 can further operate as another group to enable a selective power delivery from the power module 44 to the energy storage power output 48. In this sense, power is supplied from, or discharged from, the set of DC energy storage units, such as a set of batteries 60, to the energy storage power output 48, and accumulated at the common DC power supply system output 30. In this example of selective power delivery from the power module 44 to the energy storage power output 48, it is envisioned that the third switching module 68 is operated in a non-conducting mode. Similar to the selective power delivery from the power module 44 to the energy storage power output 48, in instances where the set of DC energy storage units is rechargeable, the first switching module 64 and second switching module 66 can allow for conducting modes to receive power at the energy storage power output 48, and recharge the power module from the received power.

Yet another non-limiting aspect of the disclosure can be included wherein the first switching module 64, the second switching module 66, the third switching module 68, or a combination thereof, can be operably controlled to operate as the DC to DC power converter 46, such as a boost converter, to convert, modify, adapt, alter, or otherwise change characteristics of the power supplied from (or delivered to, in a recharging mode) the power module 44 to a desired or predetermined characteristics of power provided to the energy storage power output 48.

Additional aspects of the disclosure can be included. For example, as shown, further components can be included, as needed, to provide for desired power management characteristics. In one non-limiting example, an inductor 62 is provided in-line with the energy storage power output 48, for ripple current mitigation. In one non-limiting example, the available power output for each respective power supply unit 32 can be approximately 50 Volts DC. In this example, 50 Volts DC can define the power supplied from the respective power module 44, or the power supplied at the output of the DC to DC power converter 46. In this sense, the DC to DC power converter can be "rated" or selected for electrical characteristics that enable the 50 Volt DC power output in the desired power distribution implementation, such as in an aircraft power distribution system. In another non-limiting aspect of the disclosure, the dynamic power supply system 24 can include a maximum desired power output at the common DC power supply system output 30 of greater than 1 kV DC, such as 1.2 kV DC or 2.4 kV DC.

The set of switching modules 64, 66, 68 can be controllably operated by one of the power module management system 42 or the controller module 34 (by way of the communication connections 40, not shown). Collectively, the controller module 34 can independently operate at least one of the respective power module management system 42, DC to DC power converter 46, at least a subset of the switching modules 64, 66, 68, or a combination thereof, of the respective power supply unit 32 of the set of power supply units 32, to operably supply power from at least a first subset of the energy supply units, such as a first subset of the power modules 44, and to operate at least a second subset of the respective power module management system 42, DC to DC power converter 46, at least a subset of the switching modules 64, 66, 68, or a combination thereof, of the respective power supply unit 32 of the set of power supply units 32, to operably bypass the second subset of the energy supply units. In one non-limiting aspect of the disclosure the respective first subset and respective second subset of the power supply units 32 can vary from operation to operation, for example, to balance discharge or recharge of the set of power supply units 32.

Thus, as explained herein, the dynamic power supply system 24 can operably supply electrical power from a set of power supply units 32, wherein each power supply unit 32 includes its own respective DC to DC power converter 46. In conventional aircraft power distribution systems, higher voltage power operations (e.g. greater than or equal to 270 Volts DC) utilize centralized solutions of battery cells, or power supplied arranged in series, parallel, or in combination series-parallel, and supply power to a common or single power converter. When utilizing a centralized power converter, such as a DC to DC power converter, the conventional systems require a higher voltage rating for a semiconductor or solid-state device. Higher voltage rating generally correlates to larger size requirements, costs, and further require larger power capability buffers due to the cosmic ray effect, especially in avionics or aircraft uses.

As is well-understood, the cosmic ray effect on solid-state devices results from high energy neutrons from cosmic rays interacting with semiconductor devices, creating unexpected or unanticipated failures, operations, conducting or non-conducting states, or the like. With less atmospheric protection at higher altitudes, the cosmic ray effect has even more interruptive effects on semiconductors operating in aircraft inflight. The resulting conventional systems tend to use "overrated" power converters, that is, power converters that are rated for much larger power characteristics (i.e. a designed power characteristic) than intended in the power distribution system, to "reserve" the overrated power characteristics to mitigate the cosmic ray effect, in some examples, reserving up to 50% of the designed power characteristic or power rating of the DC to DC power converter in order to account or mitigate the cosmic ray effect (e.g. using a DC to DC power converter having double the power rating as needed for the system).

In contrast with conventional systems, aspects of the disclosure enable or allow for decentralizing the DC to DC power converters 46 within each respective power supply unit 32. This modularity enables an allows for the technical effect of utilizing smaller-rated DC to DC power converters 46 that are rated based on the individual power supply unit 32, reducing cost, complexity, space needed, and overrating consideration, as explained herein. In this sense, utilizing smaller-rated DC to DC power converters 46 that are rated based on the individual power supply unit 32 and operably reduce the reserved voltage for the DC to DC power converter is made possible at least in part because modularity mitigates an impact of the cosmic ray effect of neutron interaction on each of the DC to DC power converters. Stated another way, the configurations disclosed reduce the impact of the cosmic ray effect which enables the "right-sizing" (e.g. reducing the reserved voltage for the DC to DC power converter, compared with higher voltage DC to DC power converters in the centralized conventional examples), enabling utilizing DC to DC power converters better matched (e.g. including a correspondingly lower or reduced reserved voltage relative to the designed power characteristics) to the load.

Thus, aspects of the disclosure can be included wherein each of the DC to DC power converters is designed to reduce a reserved voltage less than 50% of the designed power characteristics, compared with the overrated power characteristics of increasing the designed power characteristics by 50% in the conventional systems. While aspects of the disclosure describe that each of the DC to DC power converters is designed to reduce a reserved voltage less than 50% of the designed power characteristics, non-limiting aspects of the disclosure can include even further reduced reserved voltages of less than 40%, less than 30%, less than 25%, or less than 23% of the designed power characteristics, which can significantly reduce the overall voltage rating of the respective DC to DC power converter.

Figure 4:
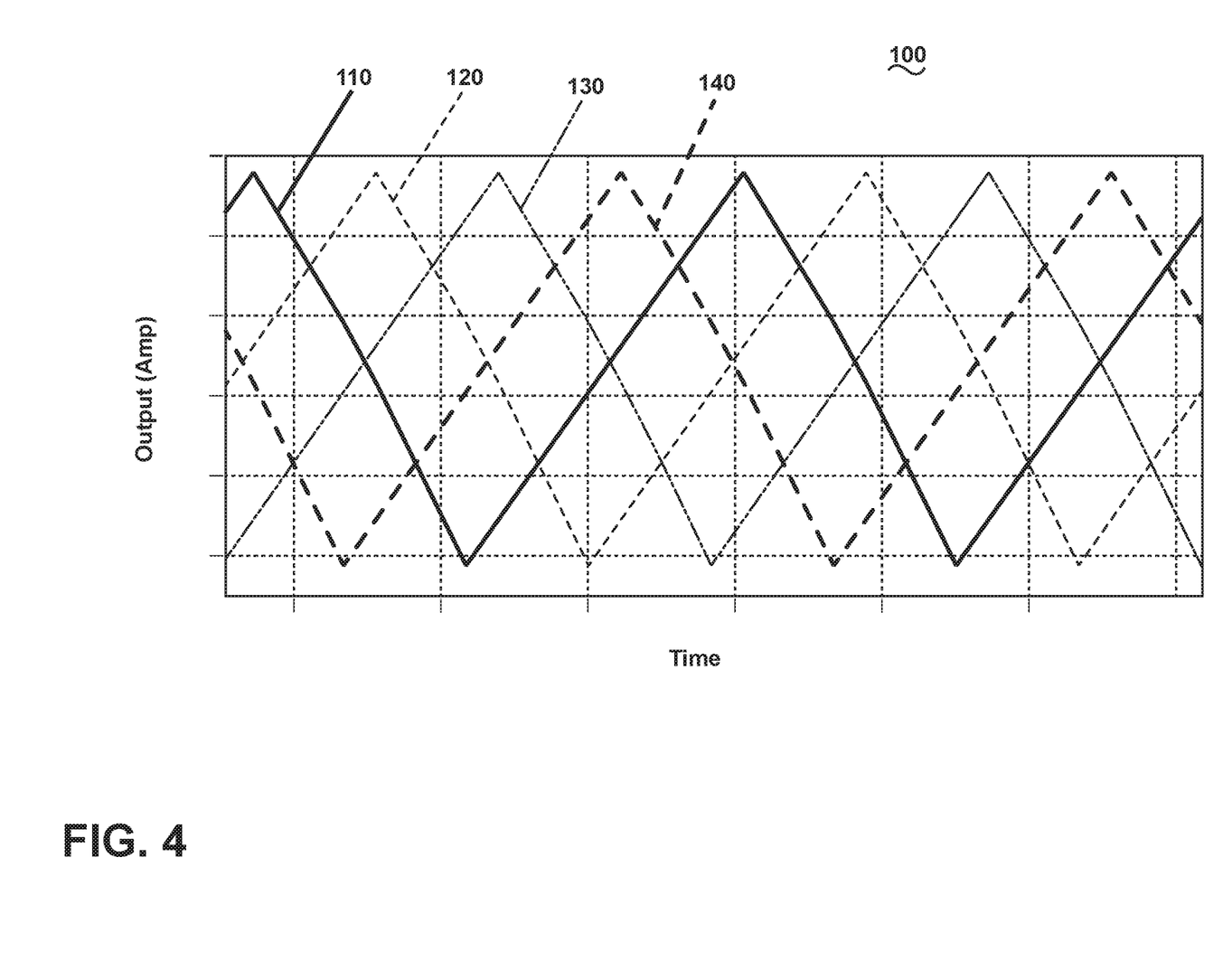
FIG. 4 is an example plot graph showing current output by way of a set of energy storage units, in accordance with various aspects described herein.

FIG. 4 illustrates an example plot graph 100 illustrated a power delivery schema applicable to aspects of the disclosure. As shown in the plot graph 100, control of the supplying of power from the set of power supply units 32 can be timed, staggered, or otherwise altered to apply a distribution of the current output at each respective energy storage power output 48, in order to provide a more consistent DC output at the common DC power supply system output 30. As shown, a first current output 110 from a first power supply unit 32, a second current output 120 from a second power supply unit 32, a third current output 130 from a third power supply unit 32, and a fourth current output 140 from a fourth power supply unit 32 can be phase-altered or phase-shifted such that the power (or current) output is consistent. While only four outputs are shown, any number of phase alterations or phase-shifting can be included in any number of corresponding power supply units 32. Furthermore, while "phase alterations" and "phase-shifts" are described, it is envisioned that the DC output "phases" between upper and lower non-zero current values; that is, it can vary between DC outputs, and does not imply alternating current output crossing a zero-current threshold.

To the extent not already described, the different features and structures of the various aspects can be used in combination with each other as desired. That certain features are not illustrated in all of the aspects is not meant to be construed that the features are not included or envisioned, but is done for brevity of description. Thus, the various features of the different aspects can be mixed and matched as desired to form new aspects, whether or not the new aspects are expressly described. Combinations or permutations of features described herein are covered by this disclosure.

One advantage that can be realized in the above aspects is that the above described aspects have lower power supply characteristics (e.g. DC voltage) per individual power supply unit, including self-contained modules that can operate independently each other power supply unit, or a centralized converter capability. This provides an inherent modularity to the dynamic power supply system that enables rapid replacement, maintenance, and higher performance at lower maintenance costs and reduced maintenance times. Furthermore, by decentralizing the converter capabilities into each respective power supply unit, the overall redundancy and reliability of the system can be increased, as failure of individual converters can be isolated for the system, compared with a single point of converter failure. Additionally, by utilizing smaller, lower voltage rating converters, the increased costs of overrating components due to the cosmic ray effect can be reduced.

Further aspects of the invention are provided by the subject matter of the following clauses:

A dynamic power supply system, comprising a set of power supply units arranged electrically in series and defining a common direct current (DC) power supply system output, each of the set of power supply units including a power module having a set of energy storage units, a DC to DC power converter connected with the power module and an energy storage unit power output, and a selective bypass arranged to controllably bypass the power module across the energy storage unit power output, and a controller module communicatively connected with each respective DC to DC power converter and the selective bypass, and configured to operate at least a first subset of the energy storage units to operably supply energy by way of operating the respective subset of the DC to DC power converters, and to operate at least a second subset of the energy storage units to operably bypass the respective subset of the selective bypasses.

The dynamic power supply system of any preceding clause, further comprising a power demand input configured to receive a power demand for the dynamic power supply system.

The dynamic power supply system of any preceding clause wherein the controller module is further configured to operate the first subset of the energy storage units and the second subset of energy storage units such that power supplied at the common DC power supply system output meets the power demand.

The dynamic power supply system of any preceding clause wherein each of the set of energy storage units includes a dischargeable energy source.

The dynamic power supply system of any preceding clause wherein the dischargeable energy source includes at least one of a battery, a bank of batteries, a rechargeable battery, or a bank of rechargeable batteries.

The dynamic power supply system of any preceding clause wherein the power demand is a transient power demand.

The dynamic power supply system of any preceding clause where the controller module is further configured to operate the respective subset of the DC to DC power converters or the first subset of the energy storage units by way of pulse width modulation.

The dynamic power supply system of any preceding clause wherein the controller module is further configured to interleave the pulse width modulate of the first subset of the energy storage units to operably reduce an output DC voltage ripple at the common DC power supply system output.

The dynamic power supply system of any preceding clause wherein each of the set of power supply units is configured to supply 50 Volts DC at the respective energy storage unit power output.

The dynamic power supply system of any preceding clause, wherein each of the DC to DC power converters are rated to supply 50 Volts DC at the respective energy storage unit power output.

The dynamic power supply system of any preceding clause, wherein each of the DC to DC power converters are solid-state DC to DC power converters.

The dynamic power supply system of any preceding clause, wherein each of the DC to DC power converters is a low-voltage DC to DC power converter designed to reduce a reserved voltage less than 50% of a designed power characteristics.

A dynamic power supply system for an aircraft power distribution system, comprising at least one generator, a direct current (DC) power bus selectively connecting the at least one generator with at least one electrical load, a set of power supply units arranged electrically in series and defining a common DC power supply system output selectively connecting with the DC power bus, each of the set of power supply units including, a power module having a set of energy storage units, a DC to DC power converter connected with the power module and an energy storage unit power output, and a selective bypass arranged to controllably bypass the power module across the energy storage unit power output, and a controller module communicatively connected with each respective DC to DC power converter and the selective bypass, and configured to determine a presence of a supplemental power demand, and in response to determining the presence of the supplemental power demand, operate at least a first subset of the power supply units to operably supply supplemental energy to the DC power bus by way of operating the respective subset of the DC to DC power converters, and to operate at least a second subset of the power supply units to operably bypass the respective subset of the selective bypasses such that power supplied at the common DC power supply system output meets the power demand.

The dynamic power supply system of any preceding clause wherein each of the set of energy storage units includes a dischargeable energy source includes at least one of a battery, a bank of batteries, a rechargeable battery, or a bank of rechargeable batteries.

The dynamic power supply system of any preceding clause wherein each of the set of energy storage units includes at least one rechargeable battery, and wherein the controller module is further configured to determine a presence of supplemental power at the DC power bus, and in response to determining the presence of the supplemental power at the DC power bus, operate at least a one of the set of energy storage units to operably recharge the at least one rechargeable battery from the DC power bus.

The dynamic power supply system of any preceding clause wherein each of the set of power supply units is configured to supply 50 Volts DC at the respective energy storage unit power output.

The dynamic power supply system of any preceding clause, wherein each of the DC to DC power converters are rated to supply 50 Volts DC at the respective energy storage unit power output.

The dynamic power supply system of any preceding clause, wherein each of the DC to DC power converters are solid-state DC to DC power converters.

The dynamic power supply system of any preceding clause, wherein each of the DC to DC power converters is a low-voltage DC to DC power converter designed to reduce a reserved voltage less than 50% of a designed power characteristics.

The dynamic power supply system of any preceding clause wherein the supplemental power demand is a transient power demand.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dynamic power supply system, comprising:
   a set of power supply units arranged electrically in series and defining a common direct current (DC) power supply system output, each of the set of power supply units including:
   a power module having a set of energy storage units;
   a DC to DC power converter connected with the power module and an energy storage unit power output; and
   a selective bypass arranged to controllably bypass the power module across the energy storage unit power output; and
   a controller module communicatively connected with each respective DC to DC power converter and the selective bypass, and configured to operate at least a first subset of the energy storage units to operably supply energy by way of operating the respective subset of the DC to DC power converters, to operate at least a second subset of the energy storage units to operably bypass the respective subset of the selective bypasses, and to operate the first subset of the energy storage units by way of interleaving a pulse width modulation, whereby the operating the first subset of the energy storage units operably reduces an output DC voltage ripple at the common DC power supply system output.

2. The dynamic power supply system of claim 1, further comprising a power demand input configured to receive a power demand for the dynamic power supply system.

3. The dynamic power supply system of claim 2 wherein the controller module is further configured to operate the first subset of the energy storage units and the second subset of energy storage units such that power supplied at the common DC power supply system output meets the power demand.

4. The dynamic power supply system of claim 3 wherein each of the set of energy storage units includes a dischargeable energy source.

5. The dynamic power supply system of claim 4 wherein the dischargeable energy source includes at least one of a battery, a bank of batteries, a rechargeable battery, or a bank of rechargeable batteries.

6. The dynamic power supply system of claim 2 wherein the power demand is a transient power demand.

7. The dynamic power supply system of claim 1 wherein each of the set of power supply units is configured to supply 50 Volts DC at the respective energy storage unit power output.

8. The dynamic power supply system of claim 7, wherein each of the DC to DC power converters are rated to supply 50 Volts DC at the respective energy storage unit power output.

9. The dynamic power supply system of claim 8, wherein each of the DC to DC power converters are solid-state DC to DC power converters.

10. The dynamic power supply system of claim 1, wherein each of the DC to DC power converters is a low-voltage DC to DC power converter designed to reduce a reserved voltage less than 50% of a designed power characteristics.

11. A dynamic power supply system for an aircraft power distribution system, comprising:
  at least one generator;
  a direct current (DC) power bus selectively connecting the at least one generator with at least one electrical load;
  a set of power supply units arranged electrically in series and defining a common DC power supply system output selectively connecting with the DC power bus, each of the set of power supply units including:
    a power module having a set of energy storage units;
    a solid-state DC to DC power converter connected with the power module and an energy storage unit power output, each of the DC to DC power converters rated to supply 50 Volts DC at the respective energy storage unit power output; and
    a selective bypass arranged to controllably bypass the power module across the energy storage unit power output; and
  a controller module communicatively connected with each respective DC to DC power converter and the selective bypass, and configured to determine a presence of a supplemental power demand, and in response to determining the presence of the supplemental power demand, operate at least a first subset of the power supply units to operably supply supplemental energy to the DC power bus by way of operating the respective subset of the DC to DC power converters, and to operate at least a second subset of the power supply units to operably bypass the respective subset of the selective bypasses such that power supplied at the common DC power supply system output meets the power demand.

12. The dynamic power supply system of claim 11 wherein each of the set of energy storage units includes a dischargeable energy source includes at least one of a battery, a bank of batteries, a rechargeable battery, or a bank of rechargeable batteries.

13. The dynamic power supply system of claim 11 wherein each of the set of energy storage units includes at least one rechargeable battery, and wherein the controller module is further configured to determine a presence of supplemental power at the DC power bus, and in response to determining the presence of the supplemental power at the DC power bus, operate at least a one of the set of energy storage units to operably recharge the at least one rechargeable battery from the DC power bus.

14. The dynamic power supply system of claim 11 wherein each of the set of power supply units is configured to supply 50 Volts DC at the respective energy storage unit power output.

15. The dynamic power supply system of claim 11, wherein each of the DC to DC power converters is a low-voltage DC to DC power converter designed to reduce a reserved voltage less than 50% of a designed power characteristics.

16. The dynamic power supply system of claim 11 wherein the supplemental power demand is a transient power demand.

* * * * *